United States Patent
Blossom

(10) Patent No.: US 7,163,153 B2
(45) Date of Patent: *Jan. 16, 2007

(54) SELECTABLE MULTI-PURPOSE CARD

(75) Inventor: George Blossom, West Chester, PA (US)

(73) Assignee: JPMorgan Chase Bank N.A., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/436,466

(22) Filed: May 13, 2003

(65) Prior Publication Data

US 2003/0209608 A1 Nov. 13, 2003

Related U.S. Application Data

(62) Division of application No. 09/730,399, filed on Dec. 6, 2000, now Pat. No. 6,631,849.

(51) Int. Cl.
*G06K 19/06* (2006.01)

(52) U.S. Cl. ............... 235/492; 235/380; 235/493; 235/487

(58) Field of Classification Search ............ 235/387, 235/492, 493, 382, 487; 705/1, 16–18, 35, 705/42–44
See application file for complete search history.

(56) References Cited

U.S. PATENT DOCUMENTS

| | | | |
|---|---|---|---|
| 3,532,543 A | 10/1970 | Nole et al. | |
| 3,546,022 A | 12/1970 | Busch et al. | |
| 3,806,369 A | 4/1974 | Dey et al. | |
| 3,946,206 A | 3/1976 | Darjany | |
| 4,047,033 A | 9/1977 | Malmberg et al. | |
| 4,465,206 A | 8/1984 | Sorel et al. | |
| 4,523,297 A | 6/1985 | Ugon et al. | |
| 4,544,834 A | 10/1985 | Newport et al. | |
| 4,545,838 A | 10/1985 | Minkus et al. | |
| 4,582,985 A | 4/1986 | Lofberg | |
| 4,614,861 A * | 9/1986 | Pavlov et al. | 235/380 |
| 4,634,845 A | 1/1987 | Hale et al. | |
| 4,689,478 A | 8/1987 | Hale et al. | |
| 4,700,055 A | 10/1987 | Kashkashian, Jr. | |
| 4,746,787 A | 5/1988 | Suto et al. | |
| 4,750,036 A | 6/1988 | Martinez | |
| 4,750,119 A | 6/1988 | Cohen et al. | |
| 4,754,418 A | 6/1988 | Hara | |
| 4,766,293 A | 8/1988 | Boston | |
| 4,825,052 A | 4/1989 | Ugon | |

(Continued)

OTHER PUBLICATIONS

International Preliminary Examination Report dated Oct. 28, 2002 for PCT/US01/03587, Slater, filed Feb. 5, 2001.

(Continued)

*Primary Examiner*—Kimberly D. Nguyen
(74) *Attorney, Agent, or Firm*—Hunton & Williams

(57) ABSTRACT

A selectable, multi-purpose card comprising a plurality of features stored in a memory storage device operatively mounted on the card and a selection device for allowing a user to select a feature in a few simple steps, preferably in a single step. In one embodiment the card includes a plurality of magnetic strips positioned on the card in a manner to allow swiping each magnetic strip separately using conventional reading devices. Each magnetic strip activates a different feature of the card. In another embodiment the card includes a programmable magnetic strip, a plurality of features stored in the memory storage device mounted on the card, a plurality of buttons or contacts, and a device for programming the magnetic strip with a different card feature. The card may also include a thin, flexible display.

27 Claims, 4 Drawing Sheets

U.S. PATENT DOCUMENTS

| | | |
|---|---|---|
| 4,831,242 A | 5/1989 | Englehardt |
| 4,833,048 A | 5/1989 | Dejonghe et al. |
| 4,859,837 A | 8/1989 | Halpern |
| 4,868,376 A | 9/1989 | Lessin et al. |
| 4,882,675 A | 11/1989 | Nichtberger et al. |
| 4,897,533 A | 1/1990 | Lyszczarz |
| 4,906,826 A | 3/1990 | Spencer |
| 4,916,296 A | 4/1990 | Streck |
| 4,922,111 A | 5/1990 | Kuwano |
| 4,923,288 A | 5/1990 | Allen et al. |
| 4,928,001 A | 5/1990 | Masada |
| 4,954,985 A | 9/1990 | Yamazaki |
| 4,968,873 A | 11/1990 | Dethloff et al. |
| 4,977,455 A | 12/1990 | Young |
| 4,978,401 A | 12/1990 | Bonomi |
| 4,999,617 A | 3/1991 | Uemura et al. |
| 5,025,372 A | 6/1991 | Burton et al. |
| 5,025,373 A | 6/1991 | Keyser, Jr. |
| 5,047,614 A | 9/1991 | Bianco |
| 5,049,728 A * | 9/1991 | Rovin ............... 235/492 |
| 5,055,662 A | 10/1991 | Hasegawa |
| 5,080,748 A | 1/1992 | Bonomi |
| 5,095,194 A | 3/1992 | Barbanell |
| 5,097,115 A | 3/1992 | Ogasawara et al. |
| 5,117,355 A | 5/1992 | McCarthy |
| 5,146,068 A * | 9/1992 | Ugawa et al. ............ 235/441 |
| 5,154,731 A | 10/1992 | Winger |
| 5,162,175 A | 11/1992 | Visco et al. |
| 5,168,151 A | 12/1992 | Nara |
| 5,173,589 A | 12/1992 | Diehl |
| 5,175,416 A | 12/1992 | Mansvelt |
| 5,192,947 A | 3/1993 | Neustein |
| 5,202,286 A | 4/1993 | Nakatani |
| 5,202,826 A | 4/1993 | McCarthy |
| 5,227,614 A | 7/1993 | Danielson |
| 5,233,654 A | 8/1993 | Harvey |
| 5,241,161 A | 8/1993 | Zuta |
| 5,247,190 A | 9/1993 | Friend et al. |
| 5,249,044 A | 9/1993 | Von Kohorn |
| 5,252,815 A | 10/1993 | Pernet |
| 5,276,311 A | 1/1994 | Hennige |
| 5,285,278 A | 2/1994 | Holman |
| 5,287,181 A | 2/1994 | Holman |
| 5,287,268 A | 2/1994 | McCarthy |
| 5,287,269 A | 2/1994 | Dorrough et al. |
| 5,297,026 A | 3/1994 | Hoffman |
| 5,311,594 A | 5/1994 | Penzias |
| 5,317,137 A | 5/1994 | Wilkins |
| 5,321,240 A | 6/1994 | Takahira |
| 5,326,960 A | 7/1994 | Tannenbaum |
| 5,328,809 A | 7/1994 | Holmes et al. |
| 5,339,239 A | 8/1994 | Manabe et al. |
| 5,340,969 A | 8/1994 | Cox |
| 5,350,906 A | 9/1994 | Brody et al. |
| 5,359,183 A | 10/1994 | Skodlar |
| 5,396,650 A | 3/1995 | Terauchi |
| 5,397,881 A | 3/1995 | Mannik |
| 5,399,502 A | 3/1995 | Friend et al. |
| 5,401,827 A | 3/1995 | Holmes et al. |
| RE34,915 E | 4/1995 | Nichtberger et al. |
| 5,412,192 A | 5/1995 | Hoss |
| 5,424,524 A | 6/1995 | Ruppert et al. |
| 5,450,477 A | 9/1995 | Amarant et al. |
| 5,465,206 A | 11/1995 | Hilt et al. |
| 5,471,669 A | 11/1995 | Lidman |
| 5,477,038 A | 12/1995 | Levine et al. |
| 5,477,040 A | 12/1995 | Lalonde |
| 5,479,494 A | 12/1995 | Clitherow |
| 5,482,139 A | 1/1996 | Rivalto |
| 5,488,571 A | 1/1996 | Jacobs |
| 5,500,514 A | 3/1996 | Veeneman et al. |
| 5,504,664 A | 4/1996 | Osterna |
| 5,506,394 A | 4/1996 | Piesko |
| 5,508,731 A | 4/1996 | Von Kohom |
| 5,510,828 A | 4/1996 | Lutterbach |
| 5,511,114 A | 4/1996 | Stimson et al. |
| 5,512,654 A | 4/1996 | Holmes et al. |
| 5,513,102 A | 4/1996 | Auriemma |
| 5,516,598 A | 5/1996 | Visco et al. |
| 5,521,363 A | 5/1996 | Tannenbaum |
| 5,523,179 A | 6/1996 | Chu |
| 5,523,794 A | 6/1996 | Mankovitz |
| 5,530,232 A | 6/1996 | Taylor |
| 5,530,235 A | 6/1996 | Stefik et al. |
| 5,535,147 A | 7/1996 | Jacobs |
| 5,537,314 A | 7/1996 | Kanter |
| 5,544,086 A | 8/1996 | Davis et al. |
| 5,544,246 A | 8/1996 | Mandelbaum et al. |
| 5,559,313 A | 9/1996 | Claus et al. |
| 5,563,948 A | 10/1996 | Diehl |
| 5,568,441 A | 10/1996 | Sanemitsu |
| 5,572,004 A | 11/1996 | Raimann |
| 5,577,109 A | 11/1996 | Stimson et al. |
| 5,578,808 A | 11/1996 | Taylor |
| 5,582,623 A | 12/1996 | Chu |
| 5,585,787 A | 12/1996 | Wallerstein |
| 5,590,038 A | 12/1996 | Pitroda |
| 5,594,493 A | 1/1997 | Nemirofsky |
| 5,604,542 A | 2/1997 | Dedrick |
| 5,608,785 A | 3/1997 | Kasday |
| 5,613,095 A | 3/1997 | Moss et al. |
| 5,621,787 A | 4/1997 | McKoy et al. |
| 5,629,977 A | 5/1997 | Fonseca |
| 5,637,845 A | 6/1997 | Kolls |
| 5,649,118 A | 7/1997 | Carlisle et al. |
| 5,652,602 A | 7/1997 | Fishman |
| 5,653,914 A | 8/1997 | Holmes et al. |
| 5,663,766 A | 9/1997 | Sizer, II |
| 5,664,110 A | 9/1997 | Green et al. |
| 5,664,157 A | 9/1997 | Takahira et al. |
| 5,672,678 A | 9/1997 | Holmes et al. |
| 5,675,607 A | 10/1997 | Alesio et al. |
| 5,677,955 A | 10/1997 | Doggett et al. |
| 5,689,100 A | 11/1997 | Carrithers et al. |
| 5,690,412 A | 11/1997 | Sheldon |
| 5,703,344 A | 12/1997 | Bezy et al. |
| 5,708,422 A | 1/1998 | Blonder et al. |
| 5,710,458 A | 1/1998 | Iwasaki |
| 5,710,886 A | 1/1998 | Christensen et al. |
| 5,715,399 A | 2/1998 | Bezos |
| 5,721,768 A | 2/1998 | Stimson et al. |
| 5,721,781 A | 2/1998 | Deo et al. |
| 5,727,153 A | 3/1998 | Powell |
| 5,728,998 A | 3/1998 | Novis et al. |
| 5,734,154 A | 3/1998 | Jachimowicz et al. |
| 5,736,727 A | 4/1998 | Nakata |
| 5,736,728 A | 4/1998 | Matsubara |
| 5,744,789 A | 4/1998 | Kashi |
| 5,751,953 A | 5/1998 | Sheils |
| 5,760,381 A | 6/1998 | Stich et al. |
| 5,761,624 A | 6/1998 | Mooney |
| 5,763,862 A | 6/1998 | Jachimowicz |
| 5,765,141 A | 6/1998 | Spector |
| 5,767,896 A | 6/1998 | Nemirofsky |
| 5,770,843 A | 6/1998 | Rose et al. |
| 5,770,849 A | 6/1998 | Novis et al. |
| 5,777,305 A | 7/1998 | Smith et al. |
| 5,777,306 A | 7/1998 | Masuda |
| 5,777,903 A | 7/1998 | Poisenka et al. |
| 5,778,067 A | 7/1998 | Jones et al. |
| 5,787,404 A | 7/1998 | Fernandez-Holmann |
| 5,789,732 A | 8/1998 | McMahon |
| 5,789,733 A | 8/1998 | Jachimowicz et al. |
| 5,804,806 A | 9/1998 | Haddad |

| | | |
|---|---|---|
| 5,806,044 A | 9/1998 | Powell |
| 5,806,045 A | 9/1998 | Biorge |
| 5,807,627 A | 9/1998 | Friend et al. |
| 5,815,127 A | 9/1998 | Jacobs |
| 5,815,657 A | 9/1998 | Williams et al. |
| 5,815,658 A | 9/1998 | Kuriyama |
| 5,819,234 A | 10/1998 | Slavin et al. |
| 5,845,259 A | 12/1998 | West et al. |
| 5,845,260 A | 12/1998 | Nakano et al. |
| 5,847,372 A * | 12/1998 | Kreft .......................... 235/492 |
| 5,854,595 A | 12/1998 | Williams |
| 5,857,079 A | 1/1999 | Claus et al. |
| 5,857,709 A | 1/1999 | Chock |
| 5,859,419 A | 1/1999 | Wynn |
| 5,864,609 A | 1/1999 | Cross et al. |
| 5,864,830 A | 1/1999 | Armetta et al. |
| 5,870,155 A | 2/1999 | Erlin |
| 5,870,718 A | 2/1999 | Spector |
| 5,870,721 A | 2/1999 | Norris |
| 5,880,769 A | 3/1999 | Nemirofsky |
| 5,883,377 A | 3/1999 | Chapin |
| 5,883,810 A | 3/1999 | Franklin et al. |
| 5,884,271 A * | 3/1999 | Pitroda .......................... 705/1 |
| 5,887,271 A | 3/1999 | Powell |
| 5,890,135 A | 3/1999 | Powell |
| 5,920,844 A | 7/1999 | Hotta et al. |
| 5,926,800 A | 7/1999 | Baronowski et al. |
| 5,930,217 A | 7/1999 | Kayanuma |
| 5,931,764 A | 8/1999 | Freeman et al. |
| 5,940,811 A | 8/1999 | Norris |
| 5,952,639 A | 9/1999 | Ohki |
| 5,952,641 A | 9/1999 | Korshun |
| 5,953,710 A | 9/1999 | Fleming |
| 5,955,961 A | 9/1999 | Wallerstein |
| 5,984,191 A * | 11/1999 | Chapin, Jr. .................. 235/493 |
| 5,991,750 A | 11/1999 | Watson |
| 5,995,372 A | 11/1999 | Asakura |
| 6,002,383 A | 12/1999 | Shimada |
| 6,003,762 A | 12/1999 | Hayashida |
| 6,003,770 A | 12/1999 | Schilling |
| 6,004,681 A | 12/1999 | Epstein et al. |
| 6,005,183 A | 12/1999 | Akai et al. |
| 6,016,954 A | 1/2000 | Abe et al. |
| 6,019,284 A | 2/2000 | Freeman et al. |
| 6,027,028 A | 2/2000 | Pieterse et al. |
| 6,032,134 A | 2/2000 | Weissman |
| 6,032,136 A | 2/2000 | Brake, Jr. |
| 9,505,189 | 2/2000 | Brake, Jr. et al. |
| 6,036,099 A | 3/2000 | Leighton |
| 6,038,552 A | 3/2000 | Fleischl et al. |
| 6,045,042 A | 4/2000 | Ohno |
| 6,049,463 A | 4/2000 | O'Malley et al. |
| 6,068,183 A * | 5/2000 | Freeman et al. ............ 235/375 |
| 6,087,954 A | 7/2000 | McSpadden et al. |
| 6,089,284 A | 7/2000 | Kaehler et al. |
| 6,091,817 A | 7/2000 | Bertina et al. |
| 6,095,412 A | 8/2000 | Bertina et al. |
| 6,095,416 A * | 8/2000 | Grant et al. ................. 235/449 |
| D431,039 S | 9/2000 | Wilson |
| D431,252 S | 9/2000 | Wilson |
| D431,573 S | 10/2000 | Wilson |
| D432,141 S | 10/2000 | Wilson |
| D432,548 S | 10/2000 | Wilson. |
| D432,552 S | 10/2000 | Wilson |
| D433,031 S | 10/2000 | Wilson |
| D433,032 S | 10/2000 | Wilson |
| D433,033 S | 10/2000 | Wilson |
| D433,034 S | 10/2000 | Wilson |
| D433,035 S | 10/2000 | Wilson |
| D433,036 S | 10/2000 | Wilson |
| D433,037 S | 10/2000 | Wilson |
| D433,059 S | 10/2000 | Okumura et al. |
| 6,128,599 A | 10/2000 | Walker et al. |
| 6,138,917 A * | 10/2000 | Chapin, Jr. .................. 235/487 |
| D433,420 S | 11/2000 | Wilson |
| D433,421 S | 11/2000 | Wilson |
| D433,422 S | 11/2000 | Wilson |
| D433,423 S | 11/2000 | Wilson |
| D433,424 S | 11/2000 | Wilson |
| D434,041 S | 11/2000 | Burke |
| 6,170,745 B1 | 1/2001 | Schilling |
| D437,882 S | 2/2001 | Creighton |
| 6,243,688 B1 | 6/2001 | Kalina |
| 6,343,743 B1 * | 2/2002 | Lamla ........................ 235/492 |
| 6,360,954 B1 * | 3/2002 | Barnardo ................... 235/492 |
| 6,402,039 B1 * | 6/2002 | Freeman et al. ............ 235/492 |
| 6,422,462 B1 | 7/2002 | Cohen |
| 6,424,029 B1 * | 7/2002 | Giesler ...................... 257/679 |
| 6,450,407 B1 | 9/2002 | Freeman et al. |
| 6,615,190 B1 | 9/2003 | Slater |
| 6,631,849 B1 * | 10/2003 | Blossom ..................... 235/492 |
| 6,641,049 B1 * | 11/2003 | Luu ............................ 235/492 |
| 6,693,544 B1 * | 2/2004 | Hebbecker ............... 340/573.1 |
| 6,802,008 B1 * | 10/2004 | Ikefuji et al. ............... 713/200 |
| 6,857,566 B1 | 2/2005 | Wankmueller |
| 6,865,547 B1 | 3/2005 | Brake, Jr. et al. |
| 2003/0135462 A1 | 7/2003 | Brake, Jr. |
| 2003/0225623 A1 | 12/2003 | Wankmueler |
| 2004/0024672 A1 | 2/2004 | Brake, Jr. |
| 2004/0049451 A1 | 3/2004 | Barardi |
| 2005/0121512 A1 | 6/2005 | Wankmueller |
| 2005/0127164 A1 | 6/2005 | Wankmueler |
| 2005/0171905 A1 | 8/2005 | Wankmueler |

OTHER PUBLICATIONS

International Search Report dated Apr. 27, 2001 for PCT/US/01/03587, Slater, filed Feb. 5, 2001.

Brown, E. and Baumgartner J., Purchasing Card Magic; Eli Lily Finds Accounts Payable Flying High with Plastic, Corporate Cashflow, vol. 15, No. 12, pp. 2-3 (Nov. 1994).

Flickenscher, L., Amex Prepaid Offering is Latest Card for Firms Rewarding Employees, American Banker, vol. 161, No. 151, pp. 1-2 (Aug. 1996).

Welcome to SwiftGift, Gift card promotion web page, www.swiftgiftcard.com, pp. 2-12 (Dec. 1998).

Here's the calling convenience you asked for: 1-800-call-AT&T . . . For All Calls, Appendix A: For Card Carriers, AT&T Universal Card with $50 in free AT&T calls; 1 800 call ATT: 7 pages.

Lisa Fickenscher, "Amex prepaid offering is latest card for firms regarding employees", American Banker, vol. 161, No. 151, p. 11, Aug. 8, 1996, (American Express Co. 's employee incentive; Inventive Funds card); (Product Announcement), 2 pages.

"Associates First Capital Corporation", Hoover's Inc., The Industry Standard: The Newsmagazine of the Internet Economy, thestandard.net/companies/company-display, Apr. 6, 1999 "How Many Risk-Free Issues Do You Want," Irving, Texas 75062, 2 pages.

Debit Card News, vol. 2, Issue 2, "Boatman's floats stored value into the employee incentive waters", Jul. 16, 1996, printed Jul. 27, 1999 @3:46pm; 3 pages.

Mickey Meece, "Boatman's prepaid cards for worker-incentive firm", American Banker, Jul. 2 1996, p. 12.

CardEx Incentives, Apr. 6, 1999, www.cardexco.com, About CardEx: www.cardex.com, 14 pages.

"Cards on the Internet—Advertising on a $3 Bill"; Gerry Vandenengel; pp. 46-48.

"Cash Card Creator Looking Beyond Mondex"; Jeffrey Kutler; Feb 9, 1995; 1 page.

Cash, Check, Charge—what's next?; David Bank, San Jose Mercury News; Seattle Times Mar. 6, 1995; 4 pages.

Nick Rosen, Cash Just Isn't Flexible Enough: Shops of the Future Will Only Take Cards, Daily Express: Technology Section, Feb. 10, 1995, 1 page.

Beth Piskora, Debit Cards Seen Poised for New Markets, American Banker, pp. 16, Mar. 7, 1995, 1 page.

Card News, vol. 6, No. 25, "D.C. Area Safeway stores look for increase in sales volume and revenue with cards", Dec. 1991, by Phillips Publishing, Inc.; Dec. 30, 1991; vol. 6, No. 25 ISSN 08494-0797; Copyright © 2000 Dow Jones & Company, Inc. All Rights Reserved; 4 pages.

"Last month, Verifone Inc. and Rite-Aid announced the introduction . . . "; printed Jul. 27, 1999 @3:51 pm; 3 pages.

"The Evolution of a New Consumerism", Chain Store Age, vol. 73, pp. 8-9, Jun. 1997, H.W. Wilson Record Number BWBA97056650, 3 pages.

First USA—Activate today and get One Hour Free calling card calls, call 1.800.555.2535; 6 pages.

First USA—Call 1(800) 335-2453 To Receive One Free Hour Of Domestic Long Distance Calling (No strings attached.); 6 pages.

"Clutter Busters" Tracy Grant; "Present Policy"; T.G.; "The Gift of Credit"; Stephanie Stoughton; 1 page.

Incentive Firms Find Debit Cards a Rewarding Experience; Debit Card News, v 3, N 11, p. 1>; Nov. 28, 1997; 3 pages.

"Key Bank Holiday Offer"; www.key.com/swiftgift/home.html; printed Apr. 5, 1999 @ 5:22pm; 14 pages.

"Microsoft, Visa to Jointly Develop PC Electronic-Shopping Software"; Don Clark, Staff Report, Wall Street Journal; 119/94; 3 pages.

Introducing Spending Money(TM), Armetta: Marketing & Design Product Concept Report, Oct 9, 1996, Presented to First USA; Oct. 9, 1996; 15 pages.

Chain Store Age Executive with Shopping Center Age, "More retailers turn to co-branding", Feb. 1, 1995, vol. 71, No. 2, ISSN 0193-1199; Copyright © 2000 Dow Jones & Company, Inc. All Rights Reserved; 3 pages.

"Our Cards" printed Apr. 6, 1999 @ 11:31:33am; 7 pages.

Spurgin. "Sopininmon! or What's happening in the retail credit card environment", Credit World Journal, Apr. 1997, Ralph E. Spurgin, Copyright UMI Company 1997. All Rights Reserved. Copyright International Credit Association Mar./Apr. 1997; Mar. 1, 1997; vol. 85, No. 4; Copyright © 2000 Dow Jones & Company, Inc. All Rights Reserved; 7 pages.

Credit Card News, "A store card issuer looks for lift from electronic gift certificates", Feb. 1, 1995, 2 pages.

Jeffery M. Lacker, "Stored Value Cards: Costly Private Substitutions for Government Currency", Economic Quarterly, 1996, 17 pages, v82, N3, p. 1(25).

Lucy Lzarony, "Stuck for a gift? Give a prepaid credit card", www.bankrate.com, Dec. 21,1998, printed Apr. 6, 1999 at 10:45 AM; 4 pages.

AT&T Marketing, "Universal card free lifetime membership extended 3 months", www.att.com/press/0297/970217.csa.html, Dec. 4, 1990, News Release, For Release Tuesday, Dec. 4, 1990; printed Jun. 24, 1999 printed 8:45 AM; 4 pages.

"Welcome to Swiftgift", Swiftgift, www.swiftgiftcard.com, Dec. 8, 1998.

Antoinette Coulton, "Incentives field moving to card-based series 14", American Banker, Mar. 26, 1998.

Business Travel News, "Maritz gets mastercard's stamp of approval", Aug. 19, 1996.

First USA Platinium Connect, First USA Bank, First USA Promotional Mailing, Oct. 1997.

Introducing the First USA Platinum Connect Card, First USA Promotional Mailing, Dec. 1997.

Phil Britt, Competing in Auto Lending, America's Community Banker, vol. 5, No. 11, pp. 33-37, Nov. 1, 1996.

Miriam Krenin Souccar, Smart Cards: 1st Union Smart Card Pilot Enlists a Second Army Base, American Banker.

First Union Issues Smart Cards to Fon Benning Recruits, CardFax.

Emerson Brown and Jim Baum, Purchasing Card Magic: Eli Lilly Finds Accounts Payable Flying High With Plastic, Corporate Cashflow.

Christine Dugas, Payroll May Ask: Paper or Plastic?, USA Today, 3B, Aug. 14, 2001.

EPPMT, A Player Goes After Big Bucks in Cyberspace, American Banker, May 5, 1995.

Sotto, An RFID Code of Conduct, RFID Journal, May 30, 2005.

Brehl, Banks issue cash-card pledge, The Toronto Star, Oct. 9, 1997, 1 page.

BS12000 Files Patent Application for Optical Bank Card, Press Release, BS12000 Web, Apr. 27, 2004.

Card Flash, Daily Payment Card News, CardWeb.com, Aug. 10, 2004.

Rosen, Cash Just Isn't Flexible Enough: Shops of the Future Will Only Take Cards, Daily Express: Technology Section, Feb. 10, 1995.

Hesseldahl, China Goes Smartcard Crazy, Forbes.com, Jun. 12, 2001.

Schwartz, Digital Cash Payoff.

Electronic Purse, SCIA (Smart Card Industry Association), About Smart Cards, printed Feb. 23, 2001, www.scia.org, 1 page.

Sanchez-Klein, Electronic purse alliance planned, Computerworld, Jul. 29, 1998, printed Feb. 23, 2001, 2 pages.

Electronic purse can free you from ATM drag, Business Times, www.btimes.co.za, printed Feb. 23, 2001, 1 page.

Electronic purse card to be launched tomorrow, News Clippings, New Straits Times, Sep. 18, 1999, printed Feb. 23, 2001, 3 pages.

E-Z Pass, Web page, http://www.ezpass.com/whatis.html, Nov. 12, 2001.

E-Z Pass, Web page, http://www.ezpass.com/frameMain.htm, Nov. 12, 2001.

E-Z Pass, Web page, http://www.ezpass.com/Disc_portNewYork.htm, Nov. 12, 2001.

E-Z Pass, Web page, http://www.ezpass.com/Disc_ ny_annual.htm, Nov. 12, 2001.

Frequently asked questions, ECARD, www.ergecard.com, printed Feb. 23, 2001, 7 pages.

Machilis, Have it the 'smart' way: Burger King program drives smart-card use, Computerworld, printed Feb. 23, 2001, 1 page.

Nokia Announces the World's First NFC Enabled Mobile Product for Contactless Payment and Ticketing, http://www.prnewswire.com, Feb. 9, 2005.

Proton world and Europay to co-operate in creation of new CEPS-compliant E-purse application, Press Release, printed Feb. 23, 2001, Waterloo, Belgium, Jun. 28, 1999, 2 pages.

Purse application for cross border use in euro, CORDIS, www.cordis.lu, PACE IST-1999-11531 PACE, printed Feb. 23, 2001, 3 pages.

RFID Tags, Contactless Smart Card Technology and Electronic Passports:Frequently Asked Questions, www.smartcardalliance.org/alliance_activities/rfd_FAQ.cfm, Feb. 17, 2005.

RFID Tags, Contactless Smart Card Technology: Comparing and Contrasting Applications and Capabilities. www.smartcardalliance.org/alliance_activities/rfdvscontactless.cfm, Feb. 17, 2005.

Dvorak, Smartcards Get Smarter, Forbes.com, Jun. 1, 2001.

Hesseldahl, Stock Focus: Smartcard Companies, Forbes.com, Jun. 18, 2001.

Load cash on to your e-purse card, Supported Currencies and Schemes, SmartAxis, printed 0/23/2001, www.smartaxis.co.uk, 9 pages.

The Electronic Purse Reaches the Car Park, printed 0/23/2001, 2 pages.

Stuber, The electronic purse: An overview of recent developments and issues, Bank of Canada, Technical Report No. 74, Jan. 1996, printed 0/23/2001, www.bankofcanada.ca, 2 pages.

Transponders: Cash In A Flash, Forbes.com, Jul. 31, 2001.

SK100 Smart Card Electronic Purse Balance Reader, printed Feb. 23, 2001, 1 page.

Smart card for loyalty and e-purse applications eclipses capability of conventional mag-stripe cards, Press Release, Apr. 21, 1997, printed Feb. 23, 2001, 3 pages, www.1.slb.com.

Gilhooly, Smart Cards Smart Move?, Computerworld, May 21, 2001.

Hesseldahl, U.S. Getting Wise To Smart Cards, Forbes.com, May 25, 2000.

ICL, Understanding the benefits: Smartcity offers a number of important benefits to both the card issuers and the customers, printed Feb. 27, 2001, www.icl.com, 2 pages.

Visa first to launch electronic purse load via GSM mobile phone, Johannesburg, Apr. 7, 1999, printed Feb. 23, 2001, www.cellular.co, 4 pages.

Hansell, Visa to unveil electronic purse cards, New York Times, printed Feb. 23, 2001, 2 pages.

Visa, MBNA and De La Rue Launch Multi-Function Smart Card Program, PR Newswire, Jul. 6, 1998.

Machlis et al., Will smart cards replace ATMs?, Computerworld, printed Feb. 23, 2001, 3 pages.

* cited by examiner

SELECTABLE MULTI-PURPOSE CARD

This application is a divisional of U.S. Ser. No. 09/730,399, filed Dec. 6, 2000 now U.S. Pat. No. 6,631,849.

FIELD OF THE INVENTION

The present invention relates generally to a financial services vehicle, such as plastic credit cards of the type commonly associated with MASTERCARD®, VISA®, AMERICAN EXPRESS®, ATM banking cards, security cards, or identification cards. More specifically, it relates to a selectable, multi-purpose card having a plurality of features stored in memory means operatively mounted on the card and selection means mounted on the card or a card reader allowing a user to select a card feature in a single step. The features when selected allow the card to function as a different card and/or to perform functions not traditionally available in financial plastic cards.

BACKGROUND OF THE INVENTION

Magnetic cards, such as commercial credit cards, debit cards, or transfer funds cards are widely used for payments, cash advances, or other financial transactions. Data for identifying the customer, such as an account number, a security code, or other identifying data is typically magnetically stored on a magnetic tape or strip embedded into the back side of the card.

When a transaction is to be performed at a retail store, a customer hands his or her card to an employee of the retail store and the employee then scans the magnetic information into a communication device.

When a credit card is utilized in a bank in order to receive a cash advance, the transaction is handled by either a teller or an automated teller machine (ATM). In the case of an ATM, the card is placed inside the ATM and the credit card owner enters a personal identification number (PIN) which is transmitted to the credit card company along with the transaction information. When the PIN number is found to be incorrect, most credit companies send to the credit card user a request to re-enter the PIN number.

Smart cards, i.e., cards having integrated circuit (IC) chips embedded into the cards are also known. A conventional smart card may include a processor coupled to an electrically erasable, programmable, read-only memory (EEPROM), read-only memory (ROM) and random access memory (RAM). These components may be fabricated onto a single integrated chip comprising a microprocessing/controller unit (MPU). The processor executes instructions stored on ROM and temporarily stores data on RAM whereas the EEPROM is a non-volatile memory used for storing data identifying the uniqueness of a smart card. A smart card also may include an input/output (I/O) signal interface for transferring various I/O signals between the smart card and an external system. The I/O interface may take the form of a contact with the external system, or a peripheral thereof, for proper transfer of signals. Alternatively, the I/O interface may take the form of a radio frequency (RF) interface for allowing communication between the smart card and the external system via the transmission and reception of RF signals. The external system may take the form, for example, of a card reader, a merchant's point of sale system, or an automated teller machine.

Typically, power is supplied to the smart card from the external system when the system communicates with the smart card. This may be accomplished through the I/O interface. However, this means that a smart card is only powered and its data is accessible only when the smart card is connected to the external system.

One of the widespread uses of smart card technology is as a stored-value card, which contains monetary value in the microchip embedded in the card. For example, each time a consumer uses a chip card in a vending machine, the amount of the purchase is deducted from the cash balance stored in the microchip on the chip card. One application for such stored-value chip cards is eliminating the need for people to carry around small coins or bills and speed up the time it takes to consummate small cash transactions. However, most chip cards do not offer built-in displays for viewing the cash balance remaining on the chip card. This reduces the convenience and ease of use of chip cards.

Some have suggested including a display to a plastic card in conjunction with input means, such as a keypad for viewing and editing information. For example, U.S. Pat. No. 4,954,985 to Yamazaki describes a smart card with a ferroelectric, liquid crystal memory region and a ferroelectric, liquid crystal display (LCD) region. U.S. Pat. No. 5,777,903 to Poisenka, et al. describes a smart card having a microprocessing unit (MPU) for executing instructions stored in a memory, a liquid crystal display (LCD), coupled to the MPU for displaying information, a keypad, coupled to the MPU and to the display for entering data by the user, an interface for transferring signals between the smart card and the external system when the smart card is coupled to the external system, and photovoltaic cells for providing power to the smart when the smart card is exposed to light.

U.S. Pat. No. 5,590,038 to Pitroda ("Pitroda") describes a card that includes an LCD display and means for selecting between various card features. The means for selecting between the various card features, described by Pitroda, are generally complex, difficult to implement and they will result in a bulky and unpractical plastic card. Moreover, LCDs such as the one suggested by Pitroda have not found wide commercial success in plastic cards. They are generally less flexible than the remainder of the plastic cards, and thus, they tend to fracture under normal use conditions. To prevent LCDs from fracturing the displays would have to be either too small or too thick. Another problem associated with multi-purpose cards, such as the card of Pitroda is that they generally require the user to follow a plurality of steps to select the desired feature. These and other problems with known plastic cards exist.

SUMMARY OF THE INVENTION

It is an object of the present invention to provide a thin, flexible, card that combines the functions of different cards into a single card instrument.

It is another object of the present invention to provide a card that includes a plurality of features and selection means that allow a user to select a desired feature preferably in a single step, prior to presenting the card to a sales person or using the card.

It is yet another object of the present invention to provide a card that may include a thin, flexible display, such as a light-emitting polymer (LEP) display for displaying information denoting the selected feature, and/or other information, or instructions relating to the selected feature. The information may be, for example, account status or recent transaction information or a graphic image such as a logo of the issuing authority.

One aspect of the present invention relates to a selectable, multi-purpose card that includes a plurality of features stored in memory means operatively mounted on the card and selection means mounted on the card for allowing a user to select a feature in only a few simple steps or preferably in a single step. In an alternative embodiment the selection means are mounted on a card reader device. The card reader may also include a display for displaying information relating to the various card features.

Preferably, the card is a thin, flexible card having substantially the same form factor as conventional plastic credit or smart cards of the type commonly associated with MASTERCARD®, VISA®, and AMERICAN EXPRESS®. Preferably, the card may be from about 80 mm to about 90 mm long, from about 50 mm to about 60 mm wide and from about 0.5 to about 1.5 mm thick.

The card can be, for example, a debit card, a credit card, a transfer funds card, a smart card, a stored-value card, a gift card, an ATM card, a security card or an identification card. The features may allow the card to function as a different card, such as a credit card, debit card, ATM bank card, stored value card, security card, identity card and the like. The card may also include means for providing or processing either account, identity, payment, health, transactional, or other information and communicating with central processing units or computers operated by the providers of services, such as credit card institutions, banks, health care providers, universities, retailers, wholesalers or other providers of goods or services employers, or membership organizations. Card features may also enable the card to communicate with or be accessed by other devices, including those used by retailers (point of sale computers), and personal computers used in other business applications or at home, for example, personal computer using a built-in or attached card reader.

A card feature may be selected by a variety of means, such as by input at the merchant point of sale, on the Internet, network, or similar virtual location, through an associated input device, or preferably by means included on the plastic card itself.

In one embodiment of the present invention, a card is provided which includes a plurality of magnetic strips, each magnetic strip containing information that allows activation of a different card feature. Preferably, the magnetic strips are positioned on the card in a manner that allows them to be read by simply swiping them in a conventional magnetic reading device such as an ATM machine or any other magnetic strip reader. However, in alternate embodiments, swiping may require a particular orientation of the card, and/or a particular depth setting of the magnetic stripe reader in order to access the appropriate feature, account, identity or other information stored on the card.

In another embodiment of the present invention a card is provided which includes a programmable magnetic strip, a plurality of features stored in memory means mounted on the card, a plurality of buttons or contacts for selecting between the features, and means for programming the magnetic strip with a different card feature. The user can select a feature by depressing or touching the buttons and or contacts which causes the programming means to program the magnetic strip with information that activates the selected feature. The user can then scan the card in a magnetic reader device. Preferably, the card of the present invention may contain a display for displaying information denoting the selected feature, or other information and instructions relating to the selected feature. More preferably, the display may be a light-emitting polymer (LEP) display.

Alternatively, a card reader may be provided comprising selection means and a display for selecting and displaying a card feature.

In yet another embodiment of the present invention, a card is provided that includes a display, preferably an LEP display, and a keypad for selecting a different card feature and/or editing information relating to the selected feature. Suitable light emitting polymeric materials include conjugated polymers such as poly (ρ-phenylene vinylene) (PPV), PPV derivatives, pyridine containing polymers and copolymers such as poly (ρ-pyridine) (PPy), poly (ρ-pyridyl vinylene) (PPyV), copolymers of PPyV and PPV derivatives (PPyVP(R)$_2$V) with various functional side groups R=$C_{12}H_{25}$, $OC_{16}H_{33}$, $COOC_{12}H_{25}$, strapped copolymer, and other conjugated polymers and copolymers.

Means also may be provided for providing storing, and recharging electric power and for selectively providing power to the components to the card. The card may also include security means for preventing unauthorized use of the card and for preventing unauthorized access to the information stored in the memory means of the card.

The present invention also relates to a method for conducting an electronic transaction comprising providing a selectable multi-purpose card and a card reader; establishing an electronic communication between the card and the card reader, selecting a card feature, and conducting an electronic transaction corresponding to the selected card feature.

Other features and advantages of the invention will become apparent from the description of preferred embodiments in conjunction with the following figures.

DETAILED DESCRIPTION OF THE PREFERRED EMBODIMENTS

Figure 1:
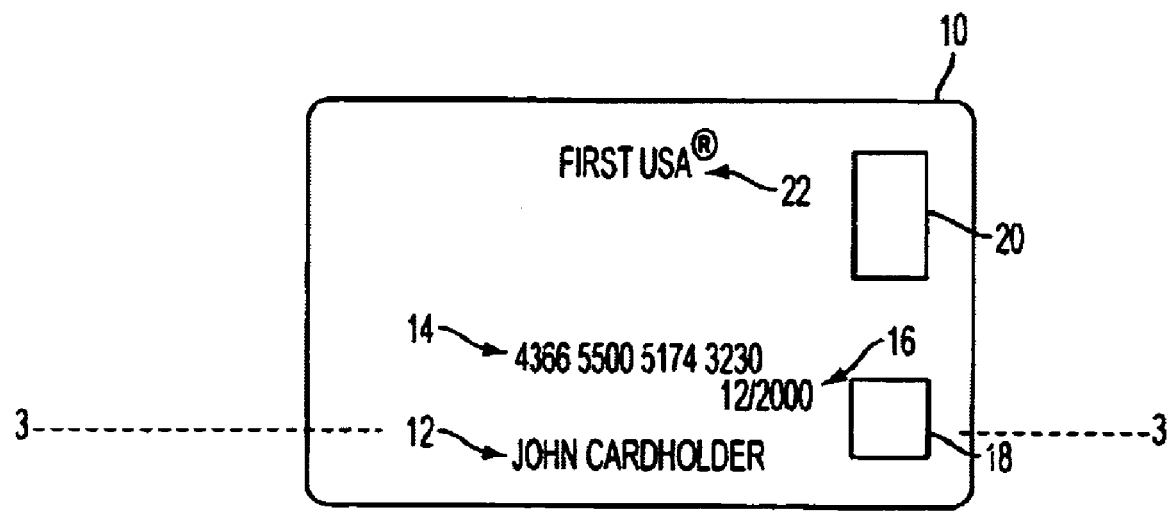
FIG. 1 is a front view of a card according to one embodiment of the present invention.
Figure 2:
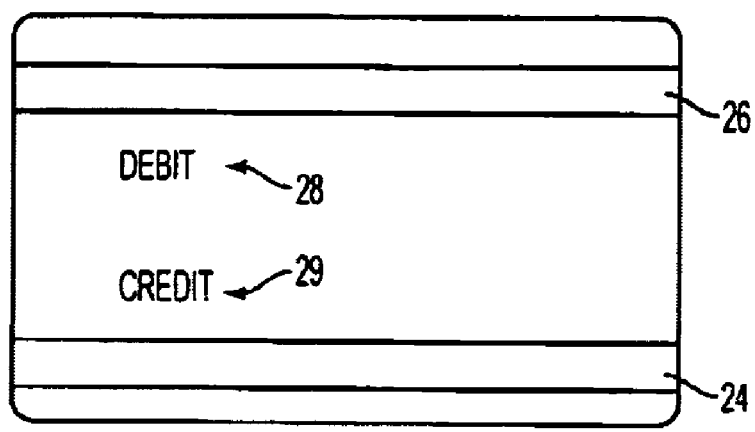
FIG. 2 is a rear view of the card of FIG. 1.

Referring to FIGS. 1 and 2, a preferred embodiment of the present invention card is provided. The front face of the card 10 has embossed letters 12 which identify the authorized user of the card 10. It further includes embossed account numbers 14 which identify the account associated with the card 10. For example, if the card is used as a credit card the account number 14 identifies the credit account from which charges are deducted when a purchase or cash advance is made.

The front face of the card 10 further may also include numbers 16 denoting the expiration date of the card, a logo 18 denoting the issuing authority such as VISA®, MASTERCARD®, AMERICAN EXPRESS®. The front face of the card 10 may further include one or more conventional design elements such as a hologram 20, and printed letters 22 denoting the financial institution issuing the card.

The rear face of the card 10 includes two magnetic strips 24 and 26. Each magnetic strip 24 is programmed with a code corresponding to a particular feature of the card and an authorization code. Embossed or printed characters 28, 29 positioned adjacent the magnetic strips 26, 24, respectively, denote the card feature that can be activated by swiping each magnetic strip. Magnetic strips 24 and 26 can be read using conventional magnetic reader devices. Magnetic strips 24 and 26 are preferably positioned in a manner that allows selection of a desired feature by simply swiping magnetic strip with the desired feature through a conventional magnetic reader device such as an ATM machine. Card 10 has width, length, and thickness dimensions similar to those of conventional plastic cards. For example, a card 10 may be about 86 mm long, about 55 mm wide, about 0.8 mm thick, and may meet other ISO Standards associated with such cards.

Figure 3A:
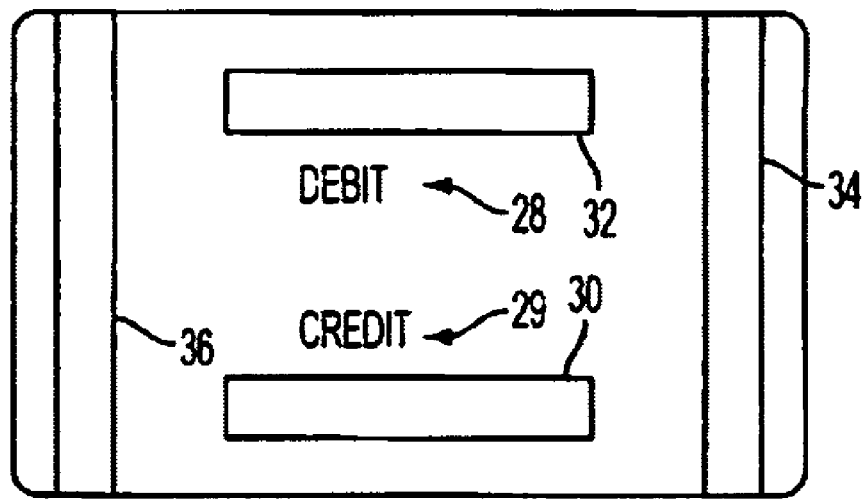
FIG. 3A is a rear view of a card according to another embodiment of the present invention.

FIG. 3A illustrates an alternative embodiment where card 10 has four magnetic strips 30, 32, 34, and 36 embedded on the rear face of card 10, which are preferably positioned sufficiently close to the edges of the card 10 to permit scanning by simply swiping conventional magnetic reader devices. However, it should be understood that the present invention is not limited to the aforementioned configuration and positioning of the magnetic strips, and that other embodiments can be envisioned by a person skilled in the art from the disclosure of the present invention. For example, the magnetic strips may be on the front or the rear face of the card.

Figure 3B:
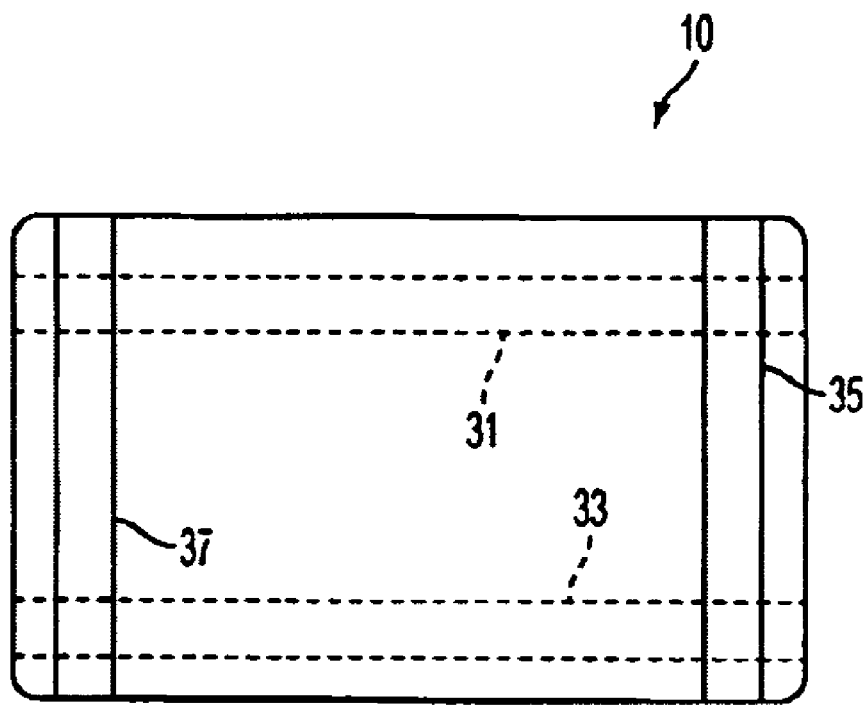
FIG. 3B is a rear view of a card according to another embodiment of the present invention.

FIG. 3B illustrates an embodiment of the present invention wherein a card has vertical magnetic strips 35 and 37 positioned on the rear face of the card and horizontal magnetic strips 31 and 33 positioned on the front face of the card. The length and width of the magnetic strips may vary. For example, the horizontal magnetic strips 31 and 33 may extend the whole length of the front face of the card as shown in FIG. 3B.

Figure 4:
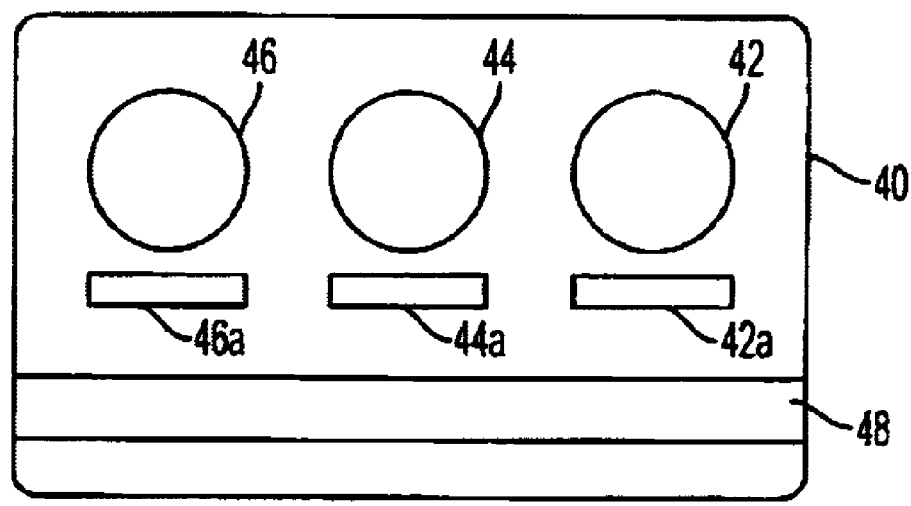
FIG. 4 is a rear view of a card according to yet another embodiment of the present invention.
Figure 5:
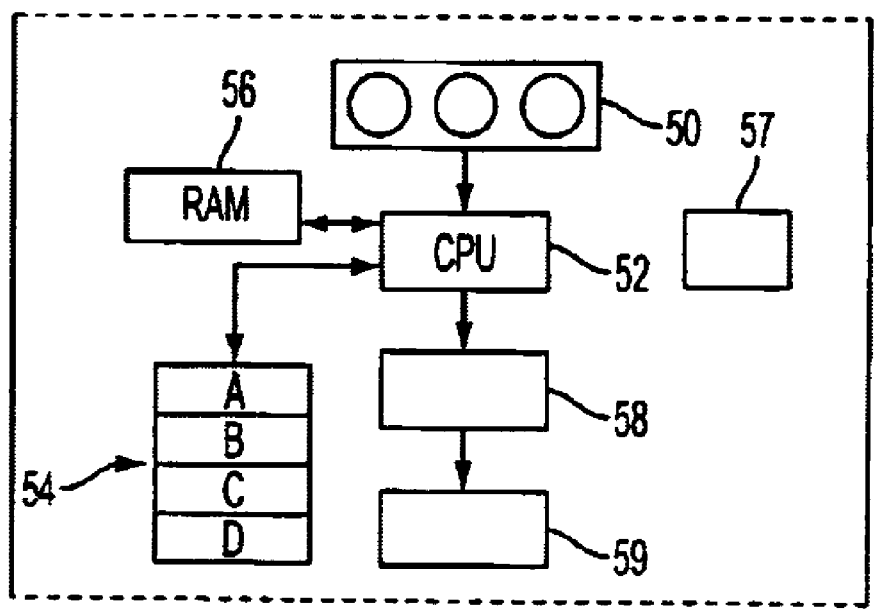
FIG. 5 is a block schematic of exemplary systems and circuits that may be employed in the card of FIG. 4.

Referring to FIGS. 4 and 5 another embodiment of the present invention is provided. FIG. 4 illustrates the rear face of a smart card 40 having a plurality of buttons 42, 44, and 46, each button activating a different card feature. For example, buttons 42, 44, and 46 may be depressible or touch sensitive buttons. Optionally, the rear face of the smart card 40 may further include characters 42a, 44a, and 46a denoting the card feature corresponding to each button 42, 44 and 46, respectively. The back face of the smart card 40 may also include a programmable magnetic strip 48. The magnetic strip is encoded with a code number or some other key corresponding to a card feature selected by the user by depressing or touching a button corresponding to that feature. To accomplish this the smart card 40 may, for example, include the systems and circuits illustrated in FIG. 5. Referring now to FIG. 5, card 40 includes a central processing unit (CPU) 52, a read-only memory (ROM) 54, dynamic memory (RAM) 56, a power supply system 57, an input control circuit 50, a magnetic strip controller 58 and an inductor 59. The power supply system 57 may be any of many well known systems such as, for example, a solar cell connected to a rechargeable battery. In operation, the CPU 52 receives power from the power supply system 57 and distributes the power to the other systems and circuits by a programmed sequence of steps which is stored in the ROM 54.

The smart card 40 may also include a display (not shown). For example, after a selection of a feature is made, a graphic image may appear on the display which looks like the face of a conventional credit card, including the account number, the user's name, the name of the credit card company and its logo. Thereafter, the user may present the card to the point of sales terminal for a sales transaction. The display is preferably a thin, flexible LEP display.

Memory 54 may be divided into a plurality of discrete portions, i.e., a common portion A containing information such as the identity of the user and a basic account number and individual discreet portions B, C and D. Each discrete portion B, C, D may contain at least a code or some other key that allows access to a specific card feature. In operation, the user may select a card feature by depressing one of the buttons 42, 44 or 46. The button controller circuit 50 is operatively connected to the CPU 52. The button controller circuit 50 detects which button is depressed and sends this information to the CPU 52. The CPU 52, in turn, uses this information to read the code and any other information stored in a discreet portion of memory 54 that corresponds to the button depressed by the user. The CPU 52 also may read the user information stored in the common portion A of memory 54, and store the code and user information in the RAM 56.

The magnetic strip 48 is then encoded with the code, user and any other information stored in the RAM 56. This encoding may be achieved by many different methods known in the art such as the one described, for example, in U.S. Pat. No. 4,868,376 to Lessin et al. which is incorporated herein by reference for all purposes to the extent that is not inconsistent with the disclosure and claims of the present invention.

For example, data to be communicated may be output from a processor and converted by magnetic strip control circuit 58. Magnetic strip control circuit 58 may output a signal that drives an inductor 59 to generate a magnetic field pattern which can be read by a card reading device. Signals representing the data to be communicated are output serially, thus emulating data encoded on a magnetic strip.

Preferably, the data is only temporarily preserved on the magnetic strip 48. After a certain predetermined period of time sufficient for completion of the transaction, for example, five minutes, the processor may supply a signal to the magnetic strip control circuit which eliminates the generation of the magnetic field, thereby decoding or erasing the magnetic strip.

In a variation of the above embodiment, instead of, or in addition to the buttons 42, 44, and 46, the plastic card may contain at least one pair of contacts which are exposed on at least one surface of the card. The contacts are designed to allow a user of the card to select a feature corresponding to the pair of contacts by bridging the exposed contacts with his finger.

In an alternative embodiment of the present invention a smart card is provided comprising a plurality of features stored in a plurality of chips operatively mounted on the card and a plurality of contact interfaces corresponding to each chip. The contact interfaces may be mounted on the front or rear face of the card for allowing a user to select a card feature separately using a smart card reader to activate a card feature via a contact interface. The contact interfaces are preferably positioned on the card to allow scanning or reading using conventional smart card readers.

In yet another embodiment, the card may include a thin, flexible, LEP display. The LEP display may cover, for example, a portion of the surface of the card or it may cover the whole surface of at least one side of the card. By selecting a feature of the card as described above, information denoting the selected feature, other information and/or instructions relating to the selected feature may appear on the display. The information may, for example, be an image, characters, numbers or any combination thereof denoting the credit card issuing authority, the credit card company and its logo. The display may be touch-sensitive, e.g., it may provide the user with a number of graphical images which enable the user to selectively chose a card feature by touching selected parts of the touch-sensitive display.

For example, a user may select a feature of the card, such as a stored-value feature. The LEP display, mounted preferably on the front side of the card (not shown), will then display the characters "STORED-VALUE" and the remaining amount in the stored value card.

In one embodiment the LEP display may comprise a semiconductor layer in the form of a thin dense polymer film comprising at least one conjugated polymer, a first electrode in contact with a first surface of the semiconductor layer and a second electrode in contact with a second surface of the semiconductor layer. The polymer film should have a sufficiently low concentration of extrinsic charge carriers so that on applying an electric potential between the first and second electrodes in a manner that renders the second electrode positive relative to the first contact layer charge carriers are injected into the semiconductor layer and light is emitted from the semiconductor layer.

In yet another embodiment, the LEP display comprises an electron transporting layer in contact with an electron blocking polymer, the electron blocking polymer incorporating a network electrode polymer. The LEP display is connected to a source of electrical current via electrodes so as to supply the electron transporting polymer with a flow of electrons, and to cause an electroluminescent emission from the heterojunction between the electron transporting polymer and the electron blocking polymer.

The electron transporting polymer may be any conductive polymeric material of appropriate conductive and electron affinity characteristics to allow it to act as the electron transporting polymer in a light emitting device. Likewise, the electron blocking polymer may be any polymeric material of appropriate electron blocking-polymer characteristics to allow it act as the electron blocking polymer in a light emitting device. The network electrode polymer may be any polymeric material that forms an electrically conducting network polymeric structure within the electron blocking polymer.

Figure 6:
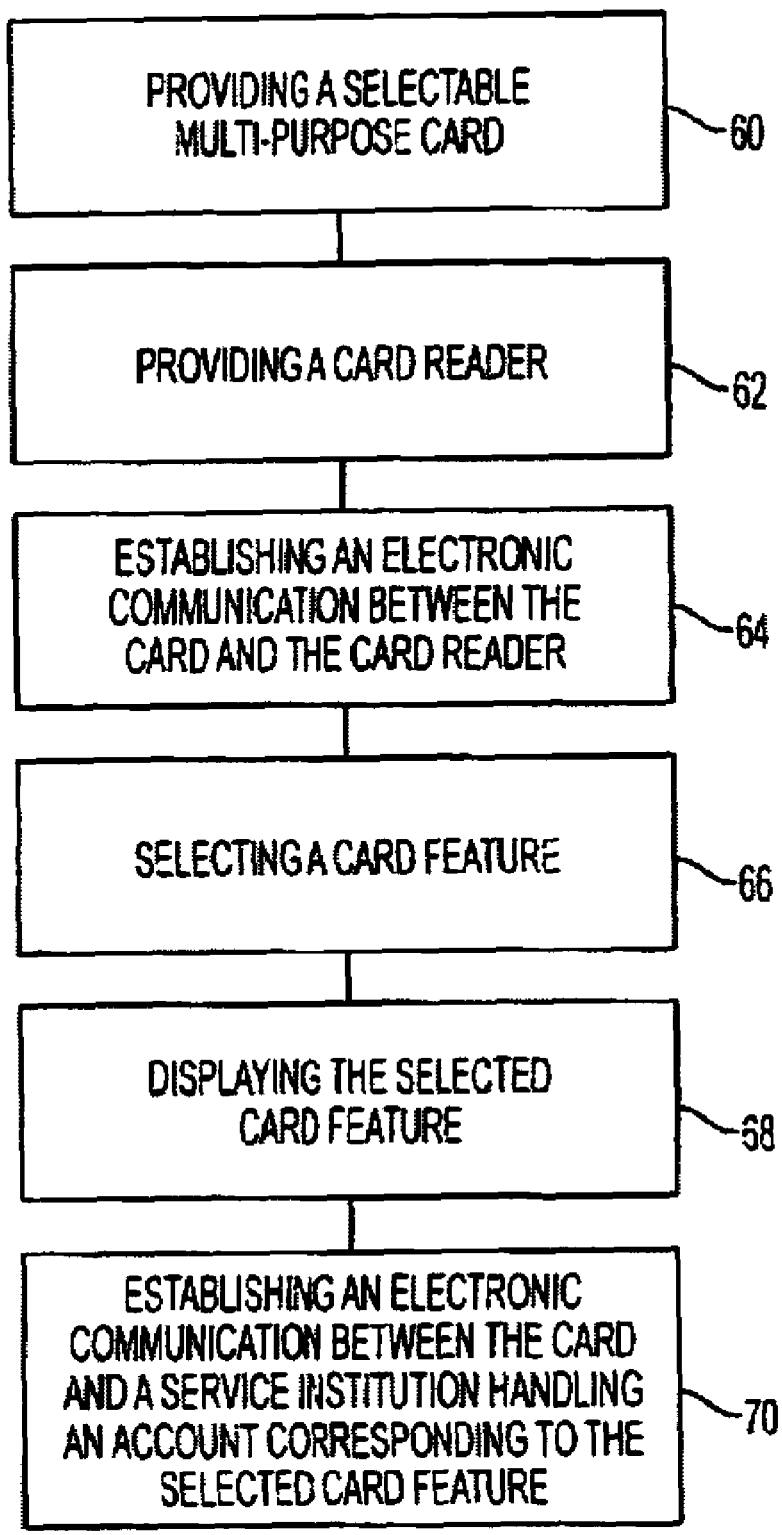
FIG. 6 is a block schematic of a preferred embodiment of the present invention method.

Referring to FIG. 6 a method for conducting an electronic transaction using the selectable multi-purpose card of the present invention is provided. The method comprises providing a selectable multi-purpose card and a card reader, according to blocks 60 and 62, respectively. The card reader may be any conventional reader having means for establishing an electronic communication between the card reader and the card, and means for establishing an electronic communication between the card and a service institution handling an account corresponding to the selected card feature. Preferably, the card reader may also include means for allowing a user to select a card feature and a display for displaying the selected card feature and/or other information relating to the selected card feature.

The method further comprises establishing an electronic communication between the card and the card reader, and selecting a card feature according to blocks 64 and 66, respectively. The selected feature may then be displayed on a display mounted either on the card or the card reader, according to block 68. The method further comprises establishing an electronic communication between the card and a service institution handling an account corresponding to the selected feature, according to block 70.

The foregoing embodiments have been presented for the purpose of illustration and description only and are not to be construed as limiting the scope of the invention in any way. The scope of the invention is to be determined from the claims appended hereto.

What is claimed is:

1. A selectable, multi-purpose card comprising:
    a plurality of card features stored in memory means operatively mounted on the card, the memory means comprising a plurality of chips mounted on the card, each chip corresponding to a card feature, wherein each of the plurality of chips is permanently mounted on the card;
    selection means mounted on the card allowing a user to select any of the plurality of card features in a single step, the selection means being electrically coupled to each of the plurality of chips; and
    a flexible light emitting polymer (LEP) display.

2. The card of claim 1, wherein the card comprises a magnetic strip card or a smart card.

3. The card of claim 1, wherein the memory means further comprises a programmable magnetic strip.

4. The card of claim 1, wherein the memory means comprise a plurality of chips positioned on the card in a manner to allow activation of each chip separately using a smart card reader, and wherein each chip stores information corresponding to a feature of the card.

5. The card of claim 1, wherein the LEP display comprises a touch-sensitive LEP display.

6. The card of claim 1, wherein the memory means is adapted to store information relating to a debit account and a credit account.

7. The card of claim 1, wherein the selection means comprises a keypad.

8. The card of claim 1, wherein the selection means comprises a plurality of buttons, each button being designated to activate a particular card feature.

9. The card of claim 1, wherein at least one of said chips corresponds to a security card feature.

10. The card of claim 1, wherein the LEP display is configured to display a security code.

11. The card of claim 1, further comprising:
    a radio frequency (RF) interface for allowing communication between the card and an external system via the transmission and reception of RF signals.

12. A selectable multi-purpose card having a plurality of features that allow the card to function as multiple cards comprising:
    a flexible light emitting polymer (LEP) display;
    memory means for storing feature information that activates the various card features, the memory means comprising a plurality of chips mounted on the card, each chip corresponding to a card feature, wherein each of the plurality of chips is permanently mounted on the card;
    input means operatively mounted on the card for allowing a user to select a card feature in a single step, the input means being electrically coupled to each of the plurality of chips;
    processing means for retrieving feature information that activates the selected card feature and outputting a drive signal representing the feature information; and
    information retaining means, responsive to the drive signal, for preserving the feature information in a form that is readable by a reader device.

13. The card of claim 12, wherein the LEP display after a selection of a card feature is made displays information denoting the selected feature.

14. The card of claim 12, wherein the information retaining means comprises an inductor, and the processing means comprises a central processor, an associated memory and magnetic strip control circuit.

15. The card of claim 12, wherein the LEP display comprises a touch sensitive LEP display.

16. A selectable, multi-purpose card comprising:
a plurality of card features stored on a plurality of chips mounted on the card, wherein each chip stores information corresponding to a feature of the card; and
selection means mounted on the card for allowing a user to select any of the plurality of card features in a single step, wherein the selection means are exposed on an outer surface of the card for touch selection by the user, the selection means being electrically coupled to each of the plurality of chips.

17. The card of claim 16, wherein the selection means comprises a plurality of contacts.

18. The card of claim 17, wherein the plurality of contacts corresponds to the plurality of chips.

19. A selectable, multi-purpose card comprising:
a plurality of card features stored in memory means operatively mounted on the card, the memory means comprising a plurality of chips mounted on the card, each chip corresponding to a card feature; and
selection means allowing a user to select any of the plurality of card features in a single step, wherein the selection means comprises a touch-sensitive display which allows the user to select a card feature by touching the touch-sensitive display, the selection means being electrically coupled to each of the plurality of chips.

20. The card of claim 19, wherein one of said chips corresponds to a stored value feature.

21. The card of claim 19, wherein one of said chips corresponds to a credit card feature.

22. The card of claim 19, wherein one of said chips corresponds to a communication feature using radio frequency signals.

23. The card of claim 19, wherein one of said chips corresponds to a debit card feature.

24. The card of claim 19, wherein a first of said chips corresponds to a credit card feature and a second of said chips corresponds to a stored value feature.

25. The card of claim 19, wherein a first of said chips corresponds to a credit card feature, a second of said chips corresponds to a stored value feature, and a third of said chips corresponds to a debit card feature.

26. A selectable, multi-purpose card comprising:
a plurality of card features stored in memory means operatively mounted on the card;
a flexible display means;
selection means mounted on the card for enabling a user to select any of the plurality of card features in a single step; and
at least one pair of contacts which are exposed on at least one surface of the card, the contacts allowing a user of the card to select a feature by bridging the exposed contacts with the user's finger.

27. A selectable, multi-purpose card comprising:
a plurality of card features stored in memory means operatively mounted on the card, the memory means comprising a plurality of chips mounted on the card, each chip corresponding to a card feature, each chip being permanently mounted on the card, wherein a first of the plurality of chips corresponds to a credit card feature, and a second of the plurality of chips corresponds to a communication feature using radio frequency signals;
selection means mounted on the card allowing a user to select a card feature, the selection means being electrically coupled to each of the plurality of chips, the selection means enabling a user to select a card feature in a single step; and
a flexible light emitting polymer (LEP) display configured to display a security code.

* * * * *